Feb. 26, 1929.  1,703,502
C. B. SPASE
MOTION TRANSMITTING MECHANISM AND CLUTCH
Filed March 5, 1925    2 Sheets-Sheet 1

INVENTOR.
Charles B. Spase.
BY Parsons & Bodell.
ATTORNEYS.

Feb. 26, 1929.
C. B. SPASE
1,703,502
MOTION TRANSMITTING MECHANISM AND CLUTCH
Filed March 5, 1925    2 Sheets-Sheet 2
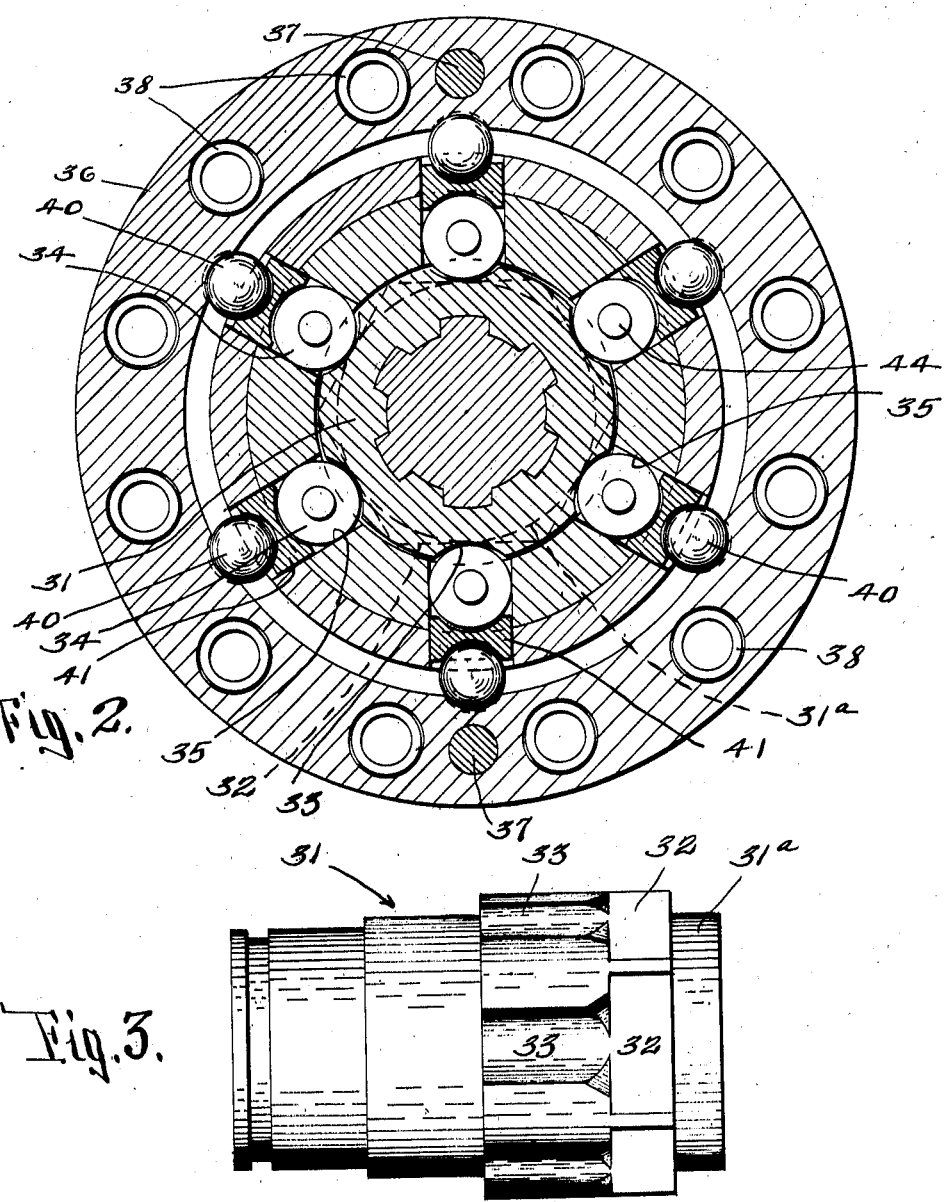

Patented Feb. 26, 1929.

1,703,502

UNITED STATES PATENT OFFICE.

CHARLES B. SPASE, OF SYRACUSE, NEW YORK, ASSIGNOR TO BROWN-LIPE GEAR COMPANY, OF SYRACUSE, NEW YORK, A CORPORATION OF NEW YORK.

MOTION-TRANSMITTING MECHANISM AND CLUTCH.

Application filed March 5, 1925. Serial No. 13,385.

This invention relates to motion transmitting mechanisms such as are used in motor vehicles to transmit the power of the engine to the driving wheels or the rear axle and has for its object an auxiliary or rear clutch of the wedge or roller type for disconnecting the transmission gearing from the propeller shaft preliminary to gear shifting operations in order that the gear shifting may take place when the gears are idle or when there is no force applied tending to turn them, which clutch is particularly simple in construction, easily operated and highly efficient and durable in use and it further has for its object a particularly simple and efficient means for cushioning or nullifying the shock of the rollers of the clutch when or as they come into engaging position.

The invention consists in the novel features and in the combinations and constructions hereinafter set forth and claimed.

In describing this invention, reference is had to the accompanying drawings in which like charactetrs designate corresponding parts in all the views.

Figure 2 is a sectional view on line 2—2, Figure 1.

Figure 3 is an elevation of the operating sleeve for the roller clutch.

Figure 1:
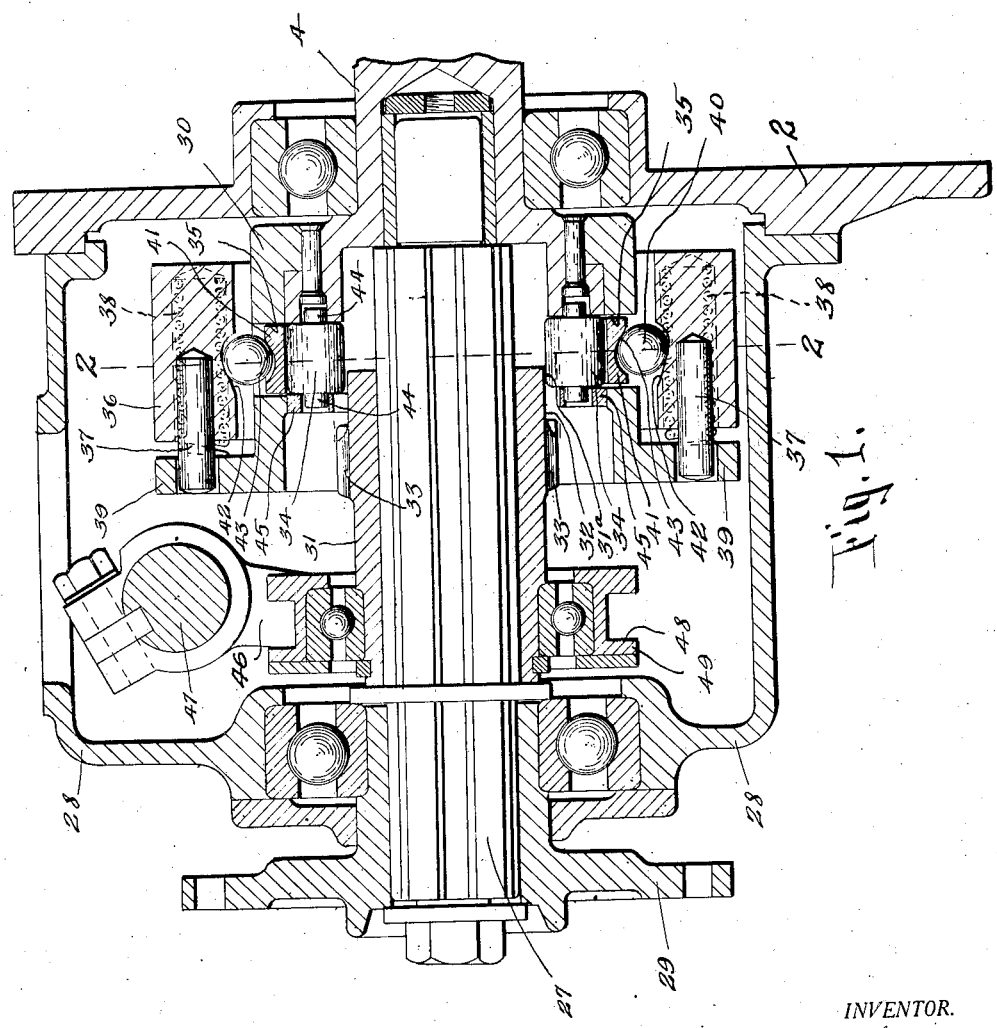
Figure 1 is an enlarged vertical longitudinal sectional view of the auxiliary or rear roller clutch.

This transmission mechanism comprises a clutch particularly adapted for connecting the driven shaft of a transmission gearing and a propeller shaft driver, which clutch comprises key members as rollers arranged to lock the sections of the clutch together and operable to release such sections, and operating means for the clutch. The clutch is usually referred to as an auxiliary or rear clutch as it is auxiliary to the main clutch of a motor vehicle and located on the rear of the transmission gearing.

The clutch comprises sections associated respectively with the driven shaft of the gearing and the propeller shaft driver, which shafts are arranged in axial alinement, one section being provided with a socket and with a key as a roller shiftable in a radial direction in a socket, and the other section comprising means for shifting the roller and a keyway for finally receiving the roller, and means for cushioning the roller when it is shifted outwardly into the socket so that the sections are engaged without shock.

27 is a propeller shaft driver which is arranged in axial alinement with the driven shaft 4 of the transmission gearing and has a pilot bearing at one end therein. It is journalled at its other end in a bearing provided in a case 28 and forming a part of or attached to the rear end of the gear case 2. The propeller shaft driver is connected to the propeller shaft by a suitable universal joint, one section of which is shown at 29.

The rear or auxiliary clutch between the driven shaft 4 and the propeller shaft driver 27 as before stated, is of the roller type provided with means for cushioning the rollers as the clutch sections are engaged, the rollers acting as sliding keys. This roller clutch comprises a head or section 30 mounted on the outer or rear end of the shaft 4, a section 31 rotatable with the shaft 27 and keys or rollers between the sections 30 and 31, these keys being movable outwardly and inwardly in radial directions and such movement being effected by a relative axial and rotative movement of the sections 30 and 31. Preferably, the section 31 is shiftable axially of the shaft 27 and is in the form of a sleeve splined to the shaft 27, the inner end of the sleeve extending into the section 30.

The sleeve 31 is formed with peripheral cam faces 32 and with keyways or grooves 33 arranged leading from the cam faces 32. The cam faces are provided by forming a portion of the sleeve polygonal or hexagonal. The longitudinal grooves or keyways are in line with the portions of the hexagonal faces 32 nearest the axis of the sleeve 31, the ends of the grooves 33 widening or flaring into the faces 32 in order to facilitate the entrance of the keys or rollers 34 from the cam faces into the grooves. The sleeve is also formed with a cylindrical end portion 31$^a$ the diameter of which is substantially the same as the diameter of the hexagonal portion. The hexagonal portion is located between the cylindrical portion 31$^a$ and the portion formed with the seats 33. This cylindrical portion is the neutral section of the sleeve. These rollers 34 are located in radially extending passages or sockets 35 formed in the section 30 and are moved radially by relative rotation of the sections in either direction causing the cam or hexagonal faces to wedge the key rollers outwardly. The keyways or grooves are arc shaped in cross section to conform to the rollers and as there is bound to be some clearance between the rollers and the grooves, the cushioning means will also cushion any backlash between the rollers and the grooves.

The means for cushioning the outward movement of the rollers or keys and hence preventing the sections of the clutch from engaging with a shock comprises a yielding movable member movable in a direction at an angle to the radial movement of the rollers and preferably in a direction axially of the section 30. As here shown, this cushioning member is a spring pressed member 36 in the form of a ring inclosing the section 30 and is operated by wedges actuated by the outward movement of the rollers. The ring 36 is connected to the section 30 to rotate therewith by pins 37 and a plurality of springs 38 act on the member 36, these springs 38 being located in sockets formed in the ring 36 and thrusting at like ends against the bottom of the sockets and at their other ends against an annular flange 39 on the section 30. The pins 37 also extend into holes in this flange 39.

The wedges operated by the rollers 34 are here shown as balls 40 interposed between opposing inclined faces on the inner face of the ring 36 and on floating blocks 41 against which the rollers act, the blocks being located in the passages 35. The ring 36 and the blocks 41 are here shown as provided with spherical sockets and with opposing inclined or cam faces 42, 43 leading in opposite directions from such sockets and inclined at oblique angles relatively to the axis of the clutch sections.

The rollers 34 are provided with suitable axles 44 located in suitable openings in the section 30 and a retaining ring 45, such openings being large enough to permit the radial shifting of the rollers. When the auxiliary clutch is "off" the rollers 34 ride on the cylindrical portion 31ª of the sleeve. Upon shifting of the sleeve to the right the polygonal faces 32 first pass under the rollers and then the sockets 33 pass under the rollers, the rollers being guided into the sockets by the funnel shaped or flaring entrances of the sockets or seats 33. As the main clutch starts to engage, and the shafts of the transmission gear are actuated, and therefore the driving section of the auxiliary clutch rotated the rollers 34 ride up toward the high points of the polygonal faces and hence clutch the driving and driven sections of the auxiliary or rear clutch together. During the final shifting of the sleeve 31, the rollers are guided into the seats 33 so that there is very little looseness or backlash in the clutch.

The means for shifting the sleeve 31 comprises a rock arm 46 mounted on a rock shaft 47 journalled in the case 28 and extending to the outside thereof and having a fork arranged in a groove 48 formed in a throwout collar 49 on the sleeve 31. When the roller clutch is off, the rollers are located opposite the cylindrical portion 31ª of the sleeve 31. Upon shifting of the sleeve 31 to the right, the sleeve is shifted to carry the cam or hexagonal faces 32 under the rollers so that relative rotation of the driven shaft 4 and propeller shaft driver 27 causes the rollers to be shifted outwardly against the tension of the springs 38. Upon further shifting the sleeve 31 to the right, the rollers slide into the keyways or grooves 33 so that the clutch is on.

The shaft 47 is rocked or operated by any suitable mechanism including a spring for throwing it in one direction to hold the clutch engaged. It is usually connected to the pedal for the front clutch.

In operation, rocking of the shaft 47 to move the sleeve 31 to the left, moves the keyways 33 and cam faces 32 out from under the rollers 34 and brings the idle or cylindrical portion 31ª of the sleeve in line with the rollers 34. When the force tending to rock the shaft is released as when the main pedal is released, the sleeve 31 moves to the right under the influence of a returning spring and causes the clutch to reengage.

What I claim is:

1. The combination of two shafts arranged in axial alinement, a clutch operable to connect and disconnect the shafts, comprising sections associated respectively with the shafts, one section being formed with a socket and with a rolling key in the socket and the other section being provided with consecutively arranged concentric dwell, cam and third portions, said third portion being formed with a lengthwise keyway for receiving the key, the keyway being formed with a flaring entrance diverging toward the cam portion, and means for operating the shiftable section to bring the rolling key member and the dwell portion, cam portion and keyway portion successively into coactive relation and successively out of coactive relation.

2. The combination of two shafts arranged in axial alinement, a clutch operating to connect and disconnect the shafts, said clutch comprising sections associated respectively with the shafts, one section being provided with a socket, a radially movable key in the socket, an axially shiftable abutment, and a wedge between the abutment and the key and arranged to be shifted outwardly against the axially shiftable abutment by the radial movement of the key, and a spring for resisting axial movement of the abutment, and the other section comprising a portion arranged to shift the key radially during relative movement of the shafts and to interlock with the key, one of the sections being shiftable axially relatively to the other to bring the sections into and out of clutching position, and means for shifting the shiftable section.

3. The combination of two shafts arranged in axial alinement, a clutch operable to connect and disconnect the shafts, said clutch comprising sections associated respectively with the shafts, one section being provided with an outwardly extending socket, a rolling key member in the socket therein, an annular abutment movable axially relatively to such section, spring means for resisting the axial movement, a thrust member in the socket and coacting with the key, the thrust member and the abutment having oppositely inclined wedge faces, a wedge interposed between said faces and acting to shift the abutment against its spring means during outward movement of the key member and the other section being provided with a dwell portion and a cam portion, and a keyway portion for the key member arranged to come into successive coacting relation with the key member, and means for effecting relative axial movement of the sections.

4. The combination of two shafts arranged in axial alinement, a clutch operable to connect and disconnect the shafts, said clutch comprising sections associated respectively with the shafts, one section being provided with an outwardly extending socket and with a rolling key shiftable in the socket, and the other section being formed with means for shifting the rolling key in the socket, and a keyway for interlocking with the rolling key, a floating block movable in the socket and against which the rolling key acts, a yielding abutment member associated with the section formed with the socket, and a wedge between the abutment member and the block and means for effecting relative axial shifting movement of the sections, to bring the key and keyway into and out of operative engagement.

5. The combination of two shafts arranged in axial alinement, a clutch operable to connect and disconnect the shafts, comprising sections associated respectively with the shafts, one section being provided with an outwardly extending socket and with a key shiftable in a radial direction in the socket and the other section comprising a keyway and means for shifting the key, spring pressed means associated with the section formed with the socket for cushioning the outward movement of the key in the socket, the cushioning means being shiftable by the outward movement of the key in a direction at an angle to the direction of movement of the key and means including a wedge arranged to be actuated by the radial movement of the key and acting on the cushioning means, the sections having a relative shifting movement to bring the key and key shifting means and keyway into and out of effective clutching position, and means for effecting relative shifting movement of the sections.

6. The combination of two shafts arranged in axial alinement, a clutch operable to connect and disconnect the shafts comprising sections associated respectively with the shafts, one section being formed with a socket and a key shiftable in a radial direction in the socket and the other section comprising means for shifting and interlocking with the key, spring pressed means associated with the section formed with the socket for cushioning the outward radial movement of the key, the cushioning means being movable in an axial direction under the outward shifting movement of the key, one section being shiftable axially to bring the key and key shifting and interlocking means into and out of clutching position, and means for effecting relative axial movement of the sections.

7. The combination of two shafts arranged in axial alinement, a clutch operable to connect and disconnect the shafts, comprising sections associated respectively with the shafts, one section being provided with an outwardly extending socket and with a key shiftable in a radial direction in the socket, and the other section comprising a keyway for receiving the key and means for shifting and guiding the key into the keyway, a yielding abutment associated with the section formed with the socket, a block in the socket coacting with the key to be shifted outwardly thereby, the block and the abutment being formed with opposing inclined cam faces, and a wedge member in the form of a ball interposed between said faces, the sections having relative shifting movement to bring the key and key shifting means and the keyway into and out of clutching position, and means for effecting relative shifting movement of the sections.

8. The combination of two shafts arranged in axial alinement, a clutch operable to connect and disconnect the shafts, said clutch comprising sections associated respectively with the shafts, one section being provided with outwardly extending sockets and rollers shiftable in radial directions in the sockets and means for shifting the rollers, comprising an axially shiftable sleeve formed with a polygonal circumferential surface, each face of which coacts with one of the rollers and with lengthwise grooves leading from said faces and means for shifting the sleeve axially.

9. The combination of two shafts arranged in axial alinement, a clutch operable to connect and disconnect the shafts, said clutch comprising sections associated respectively with the shafts, one section being provided with outwardly extending sockets and rollers shiftable in radial directions in the sockets and means for shifting the rollers, comprising an axially shiftable sleeve formed with a polygonal circumferential surface, each face of which coacts with one of the rollers and with lengthwise grooves leading from said faces, means for shifting the sleeve, and means for cushioning the outward throw of the rollers by said faces.

In testimony whereof, I have hereunto signed my name, at Syracuse, in the county of Onondaga, in the State of New York, this 5th day of February, 1925.

CHARLES B. SPASE.